(12) United States Patent
Schneider et al.

(10) Patent No.: US 6,912,110 B2
(45) Date of Patent: Jun. 28, 2005

(54) CABLE NETWORK AND METHOD FOR PROTECTING THE CABLE NETWORK AGAINST A SERIAL ARC

(75) Inventors: Bernd Schneider, Dettelbach (DE); Joachim Neubert, Schweinfurt (DE)

(73) Assignee: Leoni Bordnetz-Systeme, Nuremberg (DE)

( * ) Notice: Subject to any disclaimer, the term of this patent is extended or adjusted under 35 U.S.C. 154(b) by 257 days.

(21) Appl. No.: 10/266,321

(22) Filed: Oct. 8, 2002

(65) Prior Publication Data

US 2003/0076644 A1 Apr. 24, 2003

(30) Foreign Application Priority Data

Oct. 8, 2001 (DE) .......................... 101 49 458

(51) Int. Cl.[7] ............................................... H02H 5/04
(52) U.S. Cl. ........................................ 361/104; 361/103
(58) Field of Search ..................... 361/2, 8, 13, 18–21, 361/23–25, 103, 104, 42, 43, 46, 50, 27

(56) References Cited

U.S. PATENT DOCUMENTS

| | | | | |
|---|---|---|---|---|
| 4,104,581 A | * | 8/1978 | Arkosy | 324/523 |
| 4,788,446 A | * | 11/1988 | Sterler et al. | 340/438 |
| 5,731,944 A | * | 3/1998 | Yasukuni et al. | 361/104 |
| 5,986,350 A | * | 11/1999 | Hirano | 307/9.1 |
| 6,104,302 A | | 8/2000 | Vuong | |
| 6,118,641 A | * | 9/2000 | Atkins et al. | 361/58 |
| 2001/0029433 A1 | | 10/2001 | Scott | |
| 2004/0027749 A1 | * | 2/2004 | Zuercher et al. | 361/62 |

FOREIGN PATENT DOCUMENTS

| | | |
|---|---|---|
| DE | 196 09 009 A1 | 9/1997 |
| DE | 100 17 238 A1 | 11/2000 |
| EP | 0 961 380 A2 | 12/1999 |
| EP | 1 028 511 A2 | 8/2000 |

* cited by examiner

*Primary Examiner*—Brian Sircus
*Assistant Examiner*—Danny Nguyen
(74) *Attorney, Agent, or Firm*—Laurence A. Greenberg; Werner H. Stemer; Ralph E. Locher

(57) ABSTRACT

A cable network and a method for protecting the cable network against a serial arc are disclosed. In particular, a 42 V vehicle network for a motor vehicle is contemplated. The cable network includes a supply line connecting a voltage source and a load. The supply line includes two cable runs that are connected in parallel. Each of the cable runs contains a fuse therein. In the event of a cable defect in one (first) of the cable runs, all of the current flows via the other (second) cable run. This prevents an arc from being formed at the cable interruption in the first cable run. The fuses are preferably in the form of electronic components, which positively disconnect one another as soon as one component is activated due to a fault.

10 Claims, 1 Drawing Sheet

CABLE NETWORK AND METHOD FOR PROTECTING THE CABLE NETWORK AGAINST A SERIAL ARC

BACKGROUND OF THE INVENTION

Field of the Invention

The invention relates to a cable network, and to a method for protecting the cable network against a serial arc. In particular, the invention relates to a method for protecting a 42 V vehicle network of a motor vehicle.

Currently, the vehicle network voltage in motor vehicle networks is normally 14 V. Due to this low voltage, if a cable defect (i.e., an interruption in the cable) occurs, no serial arc is formed bridging the two cable ends of the damaged cables.

Recent developments include increasing the vehicle network voltage (in motor vehicles) to 42 V. Since arcs can occur above an operating voltage of approximately 16 V, there is a risk of serial arcs in such a 42 V vehicle network. In this context, a "serial arc" means the bridging of the cable ends of a defective and/or interrupted cable. If an arc is formed, then there also exist the risk of the arc having a stable operating point and the risk of the continuous burning of the arc (without any interruption). Thus, the risk of a fire is very high when an arc occurs. German Published, Non-Prosecuted Patent Application DE 100 17 238 A1, corresponding to U.S. Publication No. 2001/0029433 A1, describes short-circuit arc detection for an aircraft. There, the short-circuit arc is detected by a complex evaluation circuit on the basis of a characteristic noise.

SUMMARY OF THE INVENTION

It is accordingly an object of the invention to provide a cable network and a method for protecting the cable network against a serial arc, which overcome the hereinafore-mentioned disadvantages of the heretofore-known devices and methods of this general type. In particular, the invention is based on the object of protecting a 42 V vehicle network safely against arcs.

With the foregoing and other objects in view, there is provided, in accordance with the invention, a cable network having a load connected (on one side) to a voltage source via a supply line, and to ground (on the other side). In order to protect the cable network against a serial arc, the supply line is formed by at least two parallel cable runs. The two cable runs are each protected via a fuse.

This embodiment is based on the concept of providing two parallel current paths so that, if a cable defect occurs in one of the current paths formed by the cable runs, the damaged current path is effectively short-circuited by the other current path. For example, one cable run may be damaged either by a cable break or by a poor contact.

Initially, there is a risk of an arc being formed at this point depending on the boundary conditions, such as the distance between the cable ends at the damaged point and the materials that are used. The placement of the second cable run ensures that no current flows through the first cable run as soon as it is damaged, since the damaged point means that the resistance of the damaged cable run is considerably higher than that of the undamaged parallel cable run. This makes it impossible for a serial arc to be formed at the damaged point in the first cable run. In order to protect the cable network safely, the supply line is formed by the parallel cable runs over its entire length, in which (in principle) no arc can be formed.

In accordance with another feature of the invention, the two fuses (which are connected in the cable runs) are together configured for the maximum load current. In other words, each individual fuse is configured for a current below the maximum load current, and the currents which are protected by the two fuses correspond in total to the maximum load current. Thus, if one of the cable runs is damaged, the fuse in the second cable run responds, since the entire load current then flows via the second cable run. Therefore, in addition to preventing an arc being formed in the damaged cable run, the damaged cable run is detected, and the fuses also disconnect the undamaged second cable run. The identification of the damaged cable run makes it possible to replace the damaged supply line by an undamaged supply line, in order to prevent the risk of an arc being formed if the second cable run is damaged.

During normal operation, the currents flowing via the cable runs are expediently distributed uniformly, and the two fuses are each configured for half the maximum load current. Thus, the two cable runs (with the fuses placed in them) are preferably configured to be identical, which is simple to achieve during manufacturing.

In accordance with a further feature of the invention, the fuses are in the form of electronic components (for example, semiconductor switching elements). The electronic components have a better response as compared to conventional fuse links. Therefore, the damage can be identified more safely and more quickly.

In accordance with an added feature of the invention, the components are configured for zero-current identification and/or overcurrent identification. "Overcurrent identification" means that the components identify an unacceptable current increase (i.e., overcurrent) which occurs, for example, in the second cable run when the first cable run has been damaged. "Zero-current identification" means that the component identifies when current is no longer flowing via the respective cable run (for example, if the first cable run is damaged). Particularly when combined, these two characteristics result in an especially safe cable network, since the component in the undamaged cable run responds to the overcurrent, and/or the component in the damaged cable run responds to the fact that current is no longer flowing in it. Thus, both of the cable runs are reliably disconnected by the fuses.

In accordance with an additional feature of the invention, the components are connected to one another in such a way that, when one component responds, the other component also operates. Thus, both cable runs are interrupted. This provides an additional safety measure, which ensures that both the cable runs are reliably interrupted, even if only one component responds.

This ensures safe protection of the cable network in a situation in which both cable runs are damaged simultaneously. Even if the boundary conditions at both damaged points are such that, in principle, an arc can be formed, the arc will burn in a stable manner only in the cable run in which the boundary conditions are particularly advantageous. At the same time, any arc which may have originally been present in the other cable run would be quenched. Thus, current no longer flows in one cable run. However, in contrast to a situation in which one cable run is undamaged, a current which is identified by the associated component as being an overcurrent does not necessarily flow via the burning arc.

Accordingly, the fuse element in the damaged line would not be blown by the burning arc. The "arc burning" in the second cable run is quenched by the disconnection of the second cable run only due to the positive disconnection on the basis of the zero-current identification in the first component.

Particularly in this situation, in which the current can no longer flow via an undamaged cable run, the current must be disconnected as quickly as possible, although this will not be achieved by a conventional fuse link (since its response is too inert). Thus, the cable network is reliably protected in this embodiment having the fuses in the form of electronic components, which are connected to one another. This is so because it either prevents the formation of an arc, or if both cables are damaged, any arc that may burn is at least quenched reliably and quickly. Furthermore, fault diagnosis is possible.

In accordance with yet another feature of the invention (to manufacture at as low a cost as possible), the cable cross sections of the two cable runs are configured for the maximum load current overall. Each individual cable run has a cable cross section which is smaller than the cable cross section configured for the maximum load current. The two cable runs may have the same cable cross section, and each cable run may be configured for half the maximum load current in order to allow simple manufacture (due to the identical configuration of the two cable runs). Overall (in comparison to the embodiment of a single-run supply line), this does not require more material, or if at all, only a slightly greater amount of the material, for the supply line. Particularly with regard to the use of "ribbon cables", in which copper tracks are laminated onto a mount in the form of a film, the embodiment with the two parallel cable runs does not lead to any additional costs, or to only minor additional costs if at all.

In accordance with yet a further feature of the invention, if the load is grounded via a grounding cable (and is not grounded directly), the described safety measures against an arc are also provided for the grounding cable. This is achieved by a parallel placement of two grounding runs, which form the grounding cable between the load and the ground. Each of the grounding runs is configured for the maximum load current. Fuses are advantageously provided, in addition to the two grounding runs, in order to achieve safe protection. When using fuses, the grounding runs each may have smaller cable cross sections than would be necessary for the maximum load current (for cost reasons). In principle, the same measures are taken for the grounding cable as are for the supply line,.

With the objects of the invention in view, there is also provided a method in which, in the event of no fault, a load on the cable network is supplied with power via at least two parallel cable runs. If a cable defect occurs in one of the cable runs, all of the current flows via the other cable runs.

In accordance with another mode of the invention, the method further includes providing the two parallel cable runs with fuses by having one fuse in each of the two parallel cable runs. The method also includes interrupting the power supply to the load with a respective one of the fuses, located in a respective one of the two parallel cable runs through which all of the current is streaming, in the event of the fault.

In accordance with a concomitant mode of the invention, the method includes providing the fuses as two electronic components, and if one of the two electronic components responds, necessarily operating the other of the two electronic components and interrupting both of the two parallel cable runs.

The advantages and the embodiments described with respect to the cable network can be transferred, in the same context, to the-method of the invention.

Other features which are considered as characteristic for the invention are set forth in the appended claims.

Although the invention is illustrated and described herein as embodied in a cable network and a method for protecting the cable network against a serial arc, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
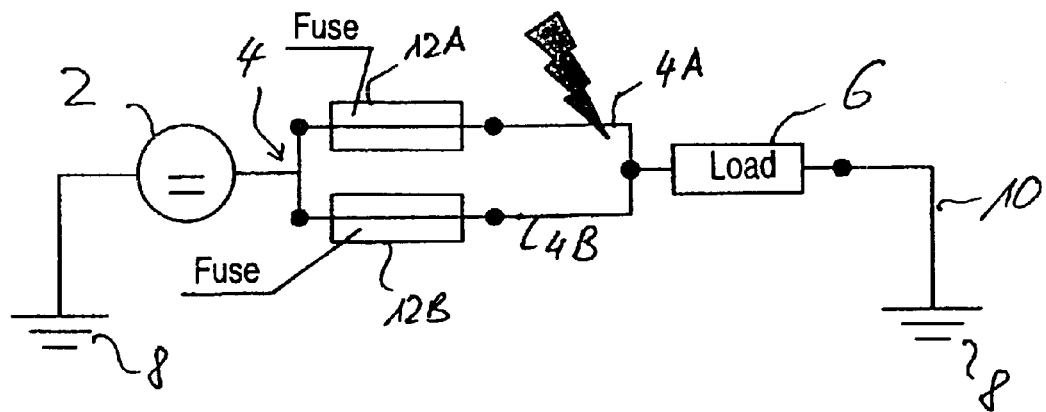
FIG. 1 is a schematic and block diagram of a supply network with two cable runs forming a supply line (in each of which a conventional fuse link is placed) according to the invention.
Figure 2:
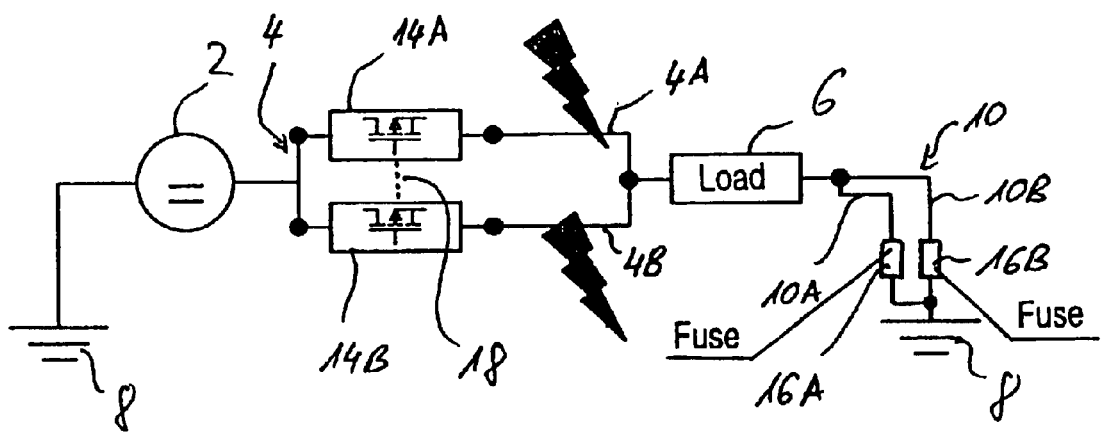
FIG. 2 is a schematic and block diagram of a section of the supply network of FIG. 1, in which semiconductor switching elements are used instead of the fuse links, and in which two grounding runs are provided that form a grounding cable and have integrated fuses.

Referring now to the figures of the drawings in detail, FIGS. 1–2 show two cable networks, which are 42 V vehicle networks for a motor vehicle. They each have a DC voltage source 2 and a supply line 4 with first and second cable runs (lines) 4A, 4B. The DC voltage source 2 is connected to a load 6 by the first and second cable runs (lines) 4A, 4B. The load 6 is in turn connected to ground 8 via a grounding cable 10.

In the exemplary embodiment of FIG. 2, the grounding cable 10 is formed by two grounding runs 10A, 10B. A fuse is connected to each of the two cable runs 4A, 4B. In the exemplary embodiment shown in FIG. 1, they are conventional fuse links 12A, 12B, and in the exemplary embodiment shown in FIG. 2, they are electronic components in the form of semiconductor switching elements 14A, 14B. A fuse 16A, 16B is also provided in each of the two grounding runs 10A, 10B.

Lightning symbols at a number of points in FIGS. 1–2 indicate cable defects, which may occur in the form of cable interruptions. Depending on the boundary conditions, such as the distance between the cable ends and the materials used, there exist the risks (in a 42 V vehicle network) of forming a serial arc, and burning in a stable condition (if the boundary conditions are suitable). An arc burning in a stable condition represents a very serious fire risk, and thus must be avoided in all cases. In the past, in the normal 14 V vehicle network, there has been no risk of an arc being formed due to the low voltage.

If the first cable run 4A of FIG. 1 has a cable defect in the form of a cable interruption, then the second cable run 4B acts as a short-circuit cable and bridges the first cable run 4A. All of the current flows via the second cable run 4B. The first cable run 4A does not carry any current, thereby preventing (from the start) any formation of an arc at the "cable interruption".

The fuse links 12A, 12B are each configured in particular for half the maximum load current, so that the fuse link 12B responds when all of the current flows via the second cable run 4B. Thus, the response of the fuse link 12B can be regarded as an indication that there is a "cable interruption" in the cable run 4A, so that the damaged cable run 4A can be replaced. A suitable choice of the fuse links 12A, 12B thus allows fault diagnosis.

In comparison to conventional fuse links, using the semiconductor switching elements 14A, 14B of FIG. 2 results in a particularly safe protection of the cable network. For this purpose, the semiconductor switching elements 14A, 14B are configured for zero-current identification and for over-current identification. If only one cable run 4A is damaged (as shown in FIG. 1), the semiconductor switching element 14A first interrupts the cable run 4A, since no current is flowing via this cable run any longer. At the same time, the semiconductor switching element 14B interrupts the cable run 4B because all the current is flowing via this cable run. Since the semiconductor switching elements 14A, 14B are likewise preferably matched to half the maximum load current, the second semiconductor switching element 14B detects an over-current. This leads to a disconnection of the second cable run 4B.

The two semiconductor switching elements 14A, 14B are connected to one another, as indicated by the connection 18 shown by a dotted line, for a particularly "safe protection" of the cable network. The two semiconductor switching elements 14A, 14B are configured, via the connection 18, such that the switching of one switching element 14A leads to the switching of the other switching element 14B.

Thus, both of the cable runs 4A, 4B are positively and safely disconnected as soon as one of the semiconductor switching elements 14A, 14B detects a fault situation (i.e., either an overcurrent or a zero current). This is particularly advantageous if a cable interruption (as indicated in FIG. 2) occurs in both cable runs 4A, 4B. Assuming suitable boundary conditions, an arc would burn in a stable form in only one cable run. However, the semiconductor switching element 14A would not necessarily identify an overcurrent. Therefore, the arc could burn in a stable form in some circumstances. However, this is avoided by the positive disconnection, which is brought about by the second switching element 14B, upon detecting the zero current that occurs in the second cable run 4B, and upon switching.

If the load 6 is not connected directly to ground 8 via the grounding cable 10 (for example, by being screwed directly to a sheet-metal component), then the grounding cable 10 (as shown in FIG. 2) is protected by measures which are comparable to the measures for the supply line 4. This protection includes forming the grounding cable 10 by two parallel grounding runs 10A, 10B. A fuse 16A, 16B which is placed in the grounding runs 10A, 10B, may be in the form of a fuse link or a semiconductor switching element.

In order to ensure safe protection for the entire supply network, all of the cable connections, in which there exists a risk of an arc being formed, are preferably formed by parallel runs. In other words, the supply line 4 is formed by the two cable runs 4A, 4B over its entire length (or, at least, substantially over its entire length) between the DC source 2 and the load 6. In order to achieve an embodiment of the supply line 4 which is as cost-effective as possible, a ribbon cable is used. The ribbon cable has at least two conductor tracks, which represent the two cable runs 4A, 4B. The same applies, of course, to all of the cables throughout the entire supply network. In other words, the supply network with the parallel runs is preferably formed by ribbon cables with a number of conductor tracks.

We claim:

1. A cable network, in a 42 V vehicle network for a motor vehicle, comprising:

a load having a first and a second side, said second side of said load connected to ground;

a supply line having cable runs including at least two parallel cable runs for protecting the cable network in the 42 V vehicle network against a serial arc, said at least two parallel cable runs having at least two fuses, including at least one fuse connected in each of said at least two parallel cable runs, said at least two fuses being electronic components, said electronic components being configured for a zero-current identification; and a voltage source connected to said first side of said load through said supply line.

2. The cable network according to claim 1, wherein said at least two fuses are configured for a maximum load current.

3. The cable network according to claim 1, wherein said electronic components are configured for a zero-current identification as well as for an overcurrent identification.

4. The cable network according to claim 1, wherein said electronic components are configured as two components to be interconnected, causing one of said two components to operate, when the other of said two components responds, thereby interrupting each of said at least two parallel cable runs.

5. The cable network according to claim 2, wherein said at least two parallel cable runs have cable cross sections each configured overall for the maximum load current.

6. The cable network according to claim 2, further comprising a grounding cable having at least two grounding runs each having a cable cross section configured for the maximum load current, said load connected to ground by said grounding cable.

7. The cable network according to claim 6, wherein said at least two grounding runs each have a respective fuse connected therein.

8. A method for protecting a cable network, in a 42 V motor vehicle network, against a serial arc, which comprises:

supplying a load with power through at least two parallel cable runs of the 42 V motor vehicle network in the event of a fault;

streaming all of a current, if a cable defect occurs in one of the two parallel cable runs, through the other of the two parallel cable runs;

providing the two parallel cable runs with fuses, one respective fuse being in each of the two parallel cable runs; and providing the fuses as two electronic components being configured for a zero-current identification.

9. The method according to claim 8, which further comprises:

interrupting the power supply to the load with a respective one of the fuses in a respective one of the two parallel cable runs through which all of the current is streaming, in the event of the fault.

10. The method according to claim 9, which further comprises:

if one of the two electronic components responds, necessarily operating the other of the two electronic components and interrupting both of the two parallel cable runs.

* * * * *